United States Patent
Swanchara, III et al.

(10) Patent No.: US 6,567,662 B1
(45) Date of Patent: May 20, 2003

(54) METHOD OF STORING AND INTERPRETING LOCI DATA IN DUAL MODE SATELLITE/TERRESTRIAL MOBILE TERMINALS

(75) Inventors: Anthony Swanchara, III, Lund (SE); Javor Kolev, Apex, NC (US); Brett Pantalone, Lund (SE)

(73) Assignee: Ericsson, Inc., Research Triangle Park, NC (US)

( * ) Notice: Subject to any disclaimer, the term of this patent is extended or adjusted under 35 U.S.C. 154(b) by 524 days.

(21) Appl. No.: 09/586,319

(22) Filed: Jun. 2, 2000

(51) Int. Cl.[7] .................................................. H04Q 7/20
(52) U.S. Cl. ........................ 455/427; 455/435; 455/456; 455/552; 370/316
(58) Field of Search ................................ 455/427–429, 455/12.1, 432, 433, 435, 456, 457, 426, 552, 553, 558, 551; 370/316

(56) References Cited

U.S. PATENT DOCUMENTS 6,118,998 A * 9/2000 Wismer et al. ............ 455/427
2001/0004595 A1 * 6/2001 Dent .......................... 455/435

* cited by examiner

*Primary Examiner*—Lester G. Kincaid
*Assistant Examiner*—Ronald J. Ward
(74) *Attorney, Agent, or Firm*—Moore & Van Allen, PLLC; Gregory A. Stephens

(57) ABSTRACT

A method of interpreting location area information data in a satellite/terrestrial dual mode mobile terminal is provided, with the mobile terminal in the satellite mode and communicating with a satellite system. The method includes the steps of determining if a most recent registration of the mobile terminal was accomplished in the satellite or terrestrial mode and, if it is determined that the most recent registration of the mobile terminal was accomplished in the terrestrial mode, then determining if (1) a satellite operator ID broadcast by the satellite system matches a satellite operator ID from a most recent satellite location update of the mobile terminal, and (2) a satellite beam pair in a satellite spotbeam pair list broadcast by the satellite system matches a satellite beam pair in a satellite spotbeam ID from a most recent satellite location update of the mobile terminal. If matches are found at both steps (1) and (2) above, then the mobile terminal initiates a location update with the satellite system in the matching satellite beam pair determined at step (2). If matches are not found at either steps (1) and/or (2) above, then the mobile terminal initiates a location update with the satellite system in the satellite spotbeam ID broadcast by the satellite system.

8 Claims, 5 Drawing Sheets

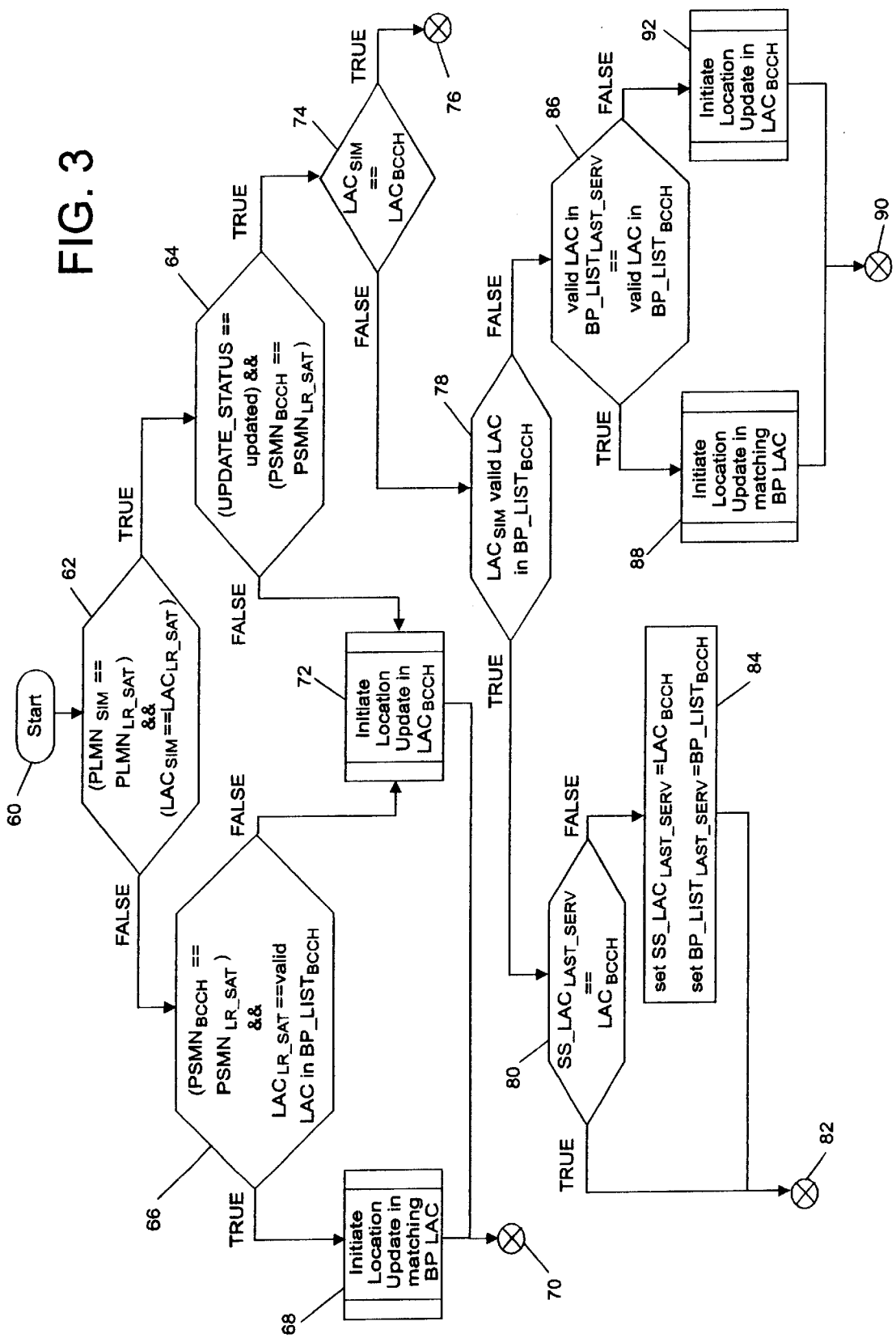

FIG. 4

| | SIM | | | E2 | | | | |
|---|---|---|---|---|---|---|---|---|
| US | PLMN | LAC | PSMN$_{LR\_SAT}$ | PLMN$_{LR\_SAT}$ | LAC$_{LR\_SAT}$ | SS_LAC | BP_LIST | |
| Satellite LU, Spotbeam 1 | Upd | PLMN$_{SAT}$ | LAC1 | PSMN$_{SAT}$ | PLMN$_{SAT}$ | LAC1 | LAC1 | BPL1 | 101 |
| Enter spotbeam 2 (beam pair with 1); LU in the beam pair LAC. | Upd | PLMN$_{SAT}$ | LAC12 | PSMN$_{SAT}$ | PLMN$_{SAT}$ | LAC12 | LAC2 | BPL2 | 102 |
| Enter satellite spotbeam 1 again, no LU | Upd | PLMN$_{SAT}$ | LAC12 | PSMN$_{SAT}$ | PLMN$_{SAT}$ | LAC12 | LAC1 | BPL1 | 103 |
| Enter GSM | Upd | PLMN$_{GSM}$ | LAC$_{GSM}$ | PSMN$_{SAT}$ | PLMN$_{SAT}$ | LAC12 | LAC1 | BPL1 | 104 |
| Enter satellite spotbeam 1 (or spotbeam 2); LU in the last registered beam pair LAC | Upd | PLMN$_{SAT}$ | LAC12 | PSMN$_{SAT}$ | PLMN$_{SAT}$ | LAC12 | LAC1 | BPL1 | 105 |
| Enter spotbeam 3 (no beam pair with 1), LU in the serving single LAC | Upd | PLMN$_{SAT}$ | LAC3 | PSMN$_{SAT}$ | PLMN$_{SAT}$ | LAC3 | LAC3 | BPL3 | 106 |
| Enter GSM | Upd | PLMN$_{GSM}$ | LAC$_{GSM}$ | PSMN$_{SAT}$ | PLMN$_{SAT}$ | LAC3 | LAC3 | BPL3 | 107 |
| Enter satellite spotbeam 3 (or a new spotbeam 4), LU in the single serving LAC | Upd | PLMN$_{SAT}$ | LAC3 | PSMN$_{SAT}$ | PLMN$_{SAT}$ | LAC3 | LAC3 | BPL3 | 108 |

FIG. 5

| | SIM | | | E2 | | | | |
|---|---|---|---|---|---|---|---|---|
| US | PLMN | LAC | PSMN$_{LR\_SAT}$ | PLMN$_{LR\_SAT}$ | LAC$_{LR\_SAT}$ | SS_LAC | BP_LIST | |
| Satellite LU in Spotbeam 1 | Upd | PLMN$_{SAT}$ | LAC1 | PSMN$_{SAT}$ | PLMN$_{SAT}$ | LAC1 | LAC1 | BPL1 | 111 |
| Enter spotbeam 2 (beam pair with 1); LU in the beam pair LAC. | Upd | PLMN$_{SAT}$ | LAC12 | PSMN$_{SAT}$ | PLMN$_{SAT}$ | LAC12 | LAC2 | BPL2 | 112 |
| Enter satellite spotbeam 1 again, no LU | Upd | PLMN$_{SAT}$ | LAC12 | PSMN$_{SAT}$ | PLMN$_{SAT}$ | LAC12 | LAC1 | BPL1 | 113 |
| Enter AMPS | Upd | PLMN$_{SAT}$ | LAC12 | PSMN$_{SAT}$ | NOT_VALID | LAC12 | LAC1 | BPL1 | 114 |
| Enter satellite spotbeam 1 (or spotbeam 2), LU in the last registered beam pair LAC | Upd | PLMN$_{SAT}$ | LAC12 | PSMN$_{SAT}$ | PLMN$_{SAT}$ | LAC12 | LAC1 | BPL1 | 115 |
| Enter spotbeam 3 (no beam pair with 1), LU in the serving single LAC | Upd | PLMN$_{SAT}$ | LAC3 | PSMN$_{SAT}$ | PLMN$_{SAT}$ | LAC3 | LAC3 | BPL3 | 116 |
| Enter AMPS | Upd | PLMN$_{SAT}$ | LAC3 | PSMN$_{SAT}$ | NOT_VALID | LAC3 | LAC3 | BPL3 | 117 |
| Enter satellite spotbeam 3 (or a new spotbeam 4), LU in the single serving LAC | Upd | PLMN$_{SAT}$ | LAC3 | PSMN$_{SAT}$ | PLMN$_{SAT}$ | LAC3 | LAC3 | BPL3 | 118 |

METHOD OF STORING AND INTERPRETING LOCI DATA IN DUAL MODE SATELLITE/TERRESTRIAL MOBILE TERMINALS

FIELD OF THE INVENTION

The present invention is directed toward dual mode satellite/terrestrial mobile terminals and, more particularly, toward a method for interpreting LOCI data in dual mode satellite/terrestrial mobile terminals.

BACKGROUND OF THE INVENTION

Dual mode satellite/terrestrial mobile terminals currently exist in the prior art, and generally include dual mode satellite/GSM (Global System for Mobile Communications) and satellite/AMPS (Advanced Mobile Phone System) mobile terminals. Location information is utilized in dual mode phones to uniquely identify the location of the mobile terminal within a particular communications system, whether it be terrestrial (GSM or AMPS) or satellite. A problem that often arises in conventional dual mode phones occurs in the handling of location information when the mobile terminal transitions between the different modes of operation. In particular, problems in the handling of location information typically occur with the dual mode phone in the satellite mode after transitioning from the terrestrial mode. Typical problems which occur in such dual mode mobile terminals include (a) the inability to uniquely identify locations areas, (b) the inability to resume satellite inclined orbit operations upon transitioning from the GSM mode, and (c) the inability to handle location information associated with the satellite mode of operation.

Dual mode mobile terminals typically implement shared usage of LOCI information on a SIM card in the mobile terminal. LOCI information is information related to the particular location of the mobile terminal, while the SIM card is a removable smart card containing a nonvolatile memory and logic which contains user subscription data. In the GSM mode, the mobile terminal LOCI information includes a PLMN/LAC pair stored on the SIM card to uniquely identify a location in GSM. The PLMN (Public Land Mobile Network) identifies a network service provider with which the mobile terminal last registered, such as, Bell Atlantic, MCI, etc., while the LAC (Location Area Code) identifies a location area within the network with which the mobile terminal last registered.

In the satellite mode, the mobile terminal LOCI information includes a PSMN/LAC pair to uniquely identify a location in the satellite system, and a PLMN/LAC pair to identify a gateway for call routing purposes. The PSMN (Public Satellite Mobile Network) identifies a satellite system with which the mobile terminal last registered. The LAC (Location Area Code) in the PSMN/LAC pair uniquely identifies a location within the satellite system with which the mobile terminal last registered. This mismatch in LOCI information in satellite and GSM modes creates problems which are compounded by how this location information is received and stored at the mobile terminal.

LAC information is received by the mobile terminal on the control channel (BCCH) in both GSM and satellite modes. However, since LAC codes are not unique to a particular network, this information is not sufficient to identify a location change of the mobile terminal. Both the LAC code and the network code (PLMN or PSMN) are required in the LOCI information to properly identify a location change of the mobile terminal. However, the network code in the LOCI information has different meanings in GSM and satellite modes of operation. The PSMN code is the satellite equivalent of the GSM PLMN code, with both codes received by the mobile terminal on the control channel. However, with the mobile terminal in the satellite mode, the PSMN code is not stored on the SIM card along with the corresponding LAC code. Instead, a PLMN code identifying a gateway for routing calls is stored on the SIM card. This PLMN gateway code is not received on the satellite control channel, but rather is transmitted by the satellite during the location update procedure. Thus, the PLMN gateway code is not available to determine whether a location update of the mobile terminal is necessary. As long as the mobile terminal remains in the satellite mode, this is not a problem. However, once the mobile terminal transitions to the GSM mode and performs a location update, the LOCI information (PLMN and LAC fields) have GSM values. Should the mobile terminal transition back to the satellite mode while in the same satellite network, i.e., same PSMN, only the LAC code is present to determine if mobile terminal has changed location. This is insufficient for proper location updating of the mobile terminal.

The present invention is directed toward overcoming one or more of the above-mentioned problems.

SUMMARY OF THE INVENTION

A method of interpreting location area information data in a satellite/terrestrial dual mode mobile terminal is provided, with the mobile terminal in the satellite mode and communicating with a satellite system. The method includes the steps of determining whether a most recent registration of the mobile terminal was accomplished in the satellite or terrestrial mode and, if it is determined that the most recent registration of the mobile terminal was accomplished in the terrestrial mode, then determining if (1) a satellite operator ID broadcast by the satellite system matches a satellite operator ID from a most recent satellite location update of the mobile terminal, and (2) a satellite beam pair in a satellite spotbeam pair list broadcast by the satellite system matches a satellite beam pair in a satellite spotbeam ID from a most recent satellite location update of the mobile terminal. If matches are found at both steps (1) and (2), then mobile terminal initiates a location update with the satellite system in the matching satellite beam pair determined at step (2).

If matches are not found at either steps (1) and/or (2) above, then the mobile terminal initiates a location update with the satellite system in the satellite spotbeam ID broadcast by the satellite system.

If it is determined that the most recent registration of the mobile terminal was accomplished in the satellite mode, then the method further includes the steps of determining if (3) an update status flag stored in the mobile terminal indicates that the mobile terminal does not need to perform a location update, and (4) a satellite operator ID broadcast by the satellite system matches a satellite operator ID from a most recent satellite location update of the mobile terminal. If either answer at steps (3) or (4) above is no, then the mobile terminal initiates a location update with the satellite system in the satellite spotbeam ID broadcast by the satellite system.

If the answers at both steps (3) and (4) above are yes, then the method further includes the step of determining if (5) a satellite spotbeam ID broadcast by the satellite system matches a satellite spotbeam ID from a most recent satellite location update of the mobile terminal and, if a match is found at step (5), then indicating that no location update of the to mobile terminal is necessary.

If the satellite spotbeam ID broadcast by the satellite system does not match a satellite spotbeam ID from a most recent satellite location update of the mobile terminal at step (5), then the method further includes the step of determining if (6) a satellite beam pair in a satellite spotbeam pair list broadcast by the satellite system matches a satellite beam pair in the satellite spotbeam ID for the most recent satellite location update of the mobile terminal. If a match is found at step (6), then the method further includes the steps of determining if (7) a satellite spotbeam ID of the spotbeam last serving the mobile terminal matches the satellite spotbeam broadcast by the satellite system and, if a match is found at step (7), then indicating that no location update of the mobile terminal is necessary.

If the satellite spotbeam ID of the spotbeam last serving the mobile terminal does not match the satellite spotbeam ID broadcast by the satellite system at step (7), then the method further includes the steps of (8) replacing, at the mobile terminal, (a) the satellite spotbeam ID of the spotbeam last serving the mobile terminal with the satellite spotbeam ID broadcast by the satellite system, and (b) the satellite beam pair list associated with the spotbeam last serving the mobile terminal with the satellite beam pair list broadcast by the satellite system.

If it is determined that the satellite beam pair in the satellite spotbeam pair list broadcast by the satellite system does not match the satellite beam pair in the satellite spotbeam ID from the most recent satellite location update of the mobile terminal at step (6), then the method further includes the steps of determining if (9) a satellite beam pair in the satellite spotbeam pair list broadcast by the satellite system matches the satellite beam pair in a satellite spotbeam ID of the spotbeam lasting serving the mobile terminal. If a match is found at step (9), then initiating a location update of the mobile terminal with the satellite system in the matching beam pair.

If the satellite beam pair in the satellite spotbeam pair list broadcast by the satellite system does not match the satellite beam pair in the satellite spotbeam ID of the spotbeam last serving a mobile terminal at step (9), then the method further includes the step of initiating a location update of the mobile terminal with the satellite system in the satellite spotbeam ID broadcast by the satellite system.

The present invention provides a method of storing and interpreting location information data in dual mode satellite/terrestrial mobile terminal with little change to the location update procedure, or to the SIM data with the mobile terminal in the terrestrial mode.

The present invention supports the current arrangement for standard GSM SIM cards and various other possible arrangements for LOCI data in dual mode mobile terminals.

Other aspects and advantages of the present invention can be obtained from a study of the application, the drawings, and the appended claims.

BRIEF DESCRIPTION OF THE DRAWINGS

FIG. 3 is a flow diagram illustrating the present inventive method;

FIG. 4 is a table illustrating the various LOCI data stored at the mobile terminal upon execution of the flow diagram of FIG. 3, with a mobile terminal transitioning between GSM and satellite modes; and FIG. 5 is a table illustrating the various LOCI data stored at the mobile terminal upon execution of the flow diagram of FIG. 3, with a mobile terminal transitioning between AMPS and satellite modes.

DETAILED DESCRIPTION OF THE PREFERRED EMBODIMENT

Figure 1:
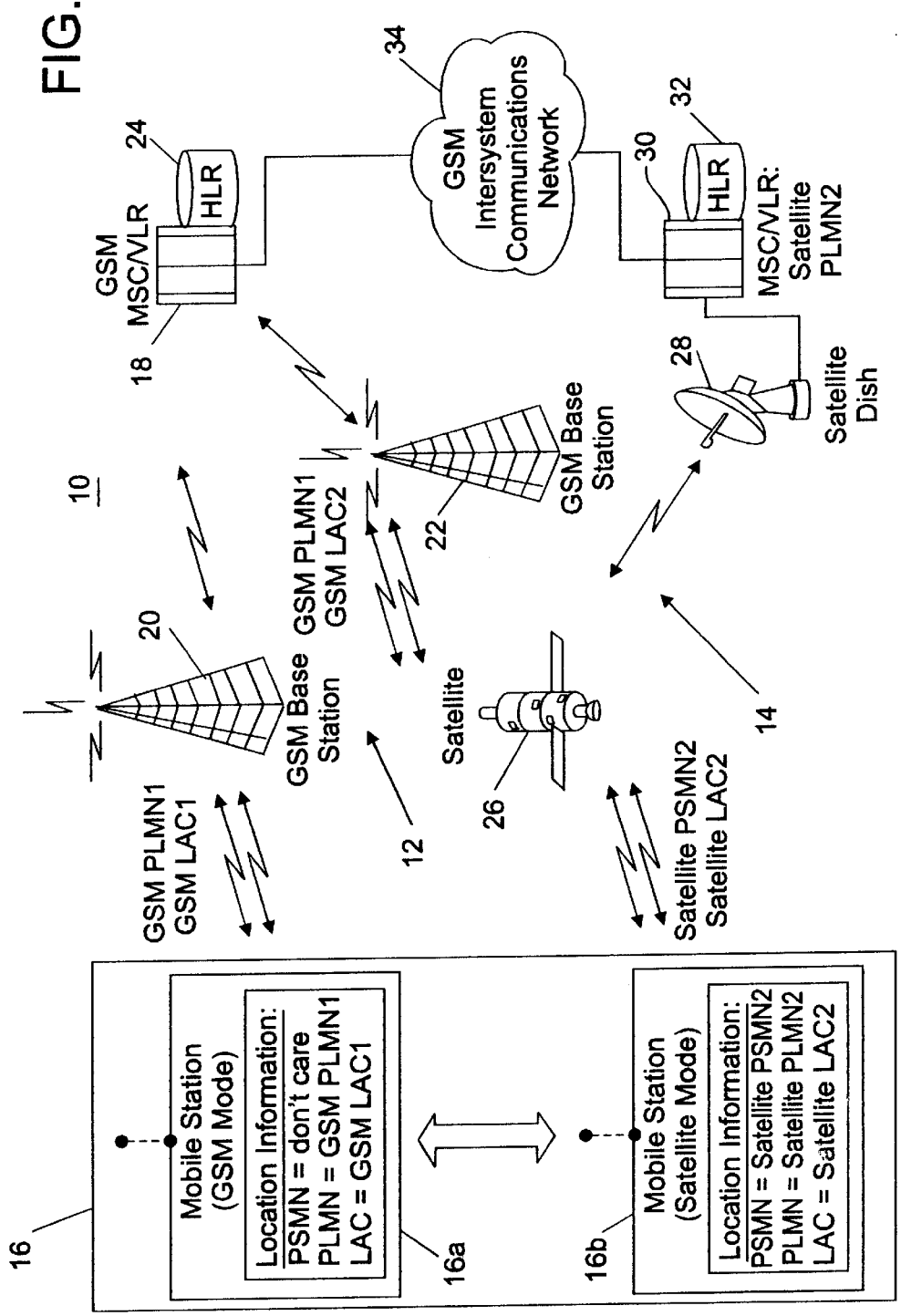
FIG. 1 illustrates a communications environment in which the inventive method may be utilized.

FIG. 1 illustrates a communication environment, shown generally at 10, within which the inventive method may be practiced. The environment 10 includes a GSM, or terrestrial, communications system 12 and a satellite communications system 14. A dual mode mobile terminal 16 communicates with either the GSM 12 or satellite 14 communications system depending upon the mode in which the dual mode mobile terminal 16 is placed. With the mobile terminal 16 in the GSM mode, shown at 16a, the mobile terminal 16a communicates with the GSM communications system 12. Similarly, with the mobile terminal 16 in the satellite mode, shown at 16b, the mobile terminal 16b communication with the satellite communications system 14. While the inventive method will be described with respect to a dual mode GSM/satellite mobile terminal, terrestrial communications systems other than GSM such as, for example, AMPS, may be incorporated without departing from the spirit and scope of the present invention.

The GSM communications system 12 includes a Mobile Switching Center (MSC) and an associated Visitor Location Register (VLR). Since each MSC has an associated VLR, the combination will be referred to herein as an MSC/VLR 18. Each MSC/VLR 18 services a different service area within the GSM system 12. For convenience, only one MSC/VLR 18 has been shown in FIG. 1.

Each MSC/VLR 18 has an associated plurality of base stations dispersed throughout the geographic extent of its service area, with each base station servicing a sub-area within the service area of its respective MSC/VLR. For convenience, only two base stations 20 and 22 are shown associated with the MSC/VLR 18. Also in the GSM system 12, there is typically a main subscriber database, often called a Home Location Register (HLR) 24, where relevant information about subscriptions (subscriber data) is stored. Such subscriber data typically includes information such as the services that a particular subscriber is permitted to use and the location of the subscriber. The base stations 20 and 22 are connected, typically through an intermediate transmission system such as a base station controller (not shown), to the MSC/VLR 18.

Each base station 20 and 22 broadcasts information on control channels relative to the particular location of the base station. For example, the base station 20 will transmit a PLMN code associated with a particular network provider of the GSM system 12, and an LAC code indicating the particular location of the base station 20, i.e., the area serviced by the base station 20. The base station 22 will likewise broadcast similar location information.

The satellite system 14 includes a satellite 26 orbiting the earth and in wireless communication with a satellite dish 28 on the ground. As used herein, the satellite 26 may refer to a single satellite or a cluster of satellites orbiting the earth. The satellite system 14 further includes an MSC/VLR 30 communicating with the satellite dish 28, and an HLR 32 storing relevant subscription information. The satellite system 14 communicates with the GSM system 12 via a standard GSM intersystem communications network 34.

With the mobile terminal 16 in the GSM mode, as at 16a, and operating within an area of coverage of the base station 20, the mobile terminal 16 receives location information broadcast on the control channel of the GSM system 12. This location information includes a PLMN code identifying the particular network provider of the GSM system 12 and an LAC code identifying the particular location of the mobile terminal 16 within the GSM system 12. Similarly, with the mobile terminal 16 in the satellite mode, as at 16b, and operating within an area of coverage of the satellite 26, the mobile terminal 16 receives location information broadcast by the satellite system 14 on the control channel. This information includes a PSMN code identifying the particular network provider of the satellite system 14 and an LAC code identifying a particular location, often referred to as a spotbeam, of the mobile terminal 16 within the satellite system 14. Upon registering with the satellite system 14, the mobile terminal 16 will also receive a PLMN code identifying a particular gateway to be used by the mobile terminal 16b to route calls.

The mobile terminal 16 includes a removable SIM card containing a nonvolatile memory and logic. The mobile terminal 16 also includes a nonvolatile, nonremovable memory, which is referred to herein as $E^2$. When performing a location update, or registering with the communications system, which is simply the mobile terminal 16 transmitting its location to the respective communications system, information relative to the location of the mobile terminal 16 is stored either in the SIM card or the memory $E^2$. Table 1 below indicates where each element of the location information is stored at the mobile terminal 16.

TABLE 1

| Satellite & GSM LOCI | |
| --- | --- |
| SIM | $E^2$ |
| UPDATE_STATUS | — |
| $PLMN_{SIM}$ | $PLMN_{LR\_SAT}$ |
| $LAC_{SIM}$ | $LAC_{LR\_SAT}$ |
| TMSI | — |
| — | $PSMN_{LR\_SAT}$ |
| — | $SS\_LAC_{LAST\_SERV}$ |
| — | $BP\_LIST_{LAST\_SERV}$ |

The UPDATE_STATUS flag is simply a flag at the mobile terminal 16 indicating whether the mobile terminal 16 needs to register, i.e., perform. a location update, with the communications system. The TMSI (Temporary Mobile Subscriber Identity) is a network assigned identifier used in GSM only. The notation "LR_SAT" refers to location information associated with the last registration of the mobile terminal 16 in the satellite mode. The notation "LAST_SERV" refers to location information associated with a spotbeam, or spotbeam pair, last serving the mobile terminal 16. For example, the "$SS\_LAC_{LAST\_SERV}$" code identifies the single spotbeam last serving the mobile terminal 16, and the $BP\_LIST_{LAST\_SERV}$ identifies the beam pair last serving the mobile terminal.

The present invention utilizes a concept called valid beam pairs in order to prevent cyclic location updating by the mobile terminal 16. For example, such cyclic location updating may occur when the mobile terminal 16 is in an area of coverage for one spotbeam, transitions to a coverage area of an adjacent spotbeam, and then transitions back to the original spotbeam area of coverage. Such transitions may not result from the mobile terminal 16 moving, but rather from movement of the satellite 26 orbiting the earth which causes its spotbeam footprint to move. In order to prevent unnecessary location updating by the mobile terminal 16 each time the mobile terminal 16 changes spotbeams, valid beam pairs are utilized.

For each coverage spotbeam, there are up to six possible spotbeams with which it can form a valid beam pair. These spotbeams would be those located adjacent to the coverage spotbeam. The satellite system 14 broadcasts on the control channel each spotbeam'unique location information (PSMN and LAC) and also a list of all valid beam pairs associated with each spotbeam.

Figure 2:
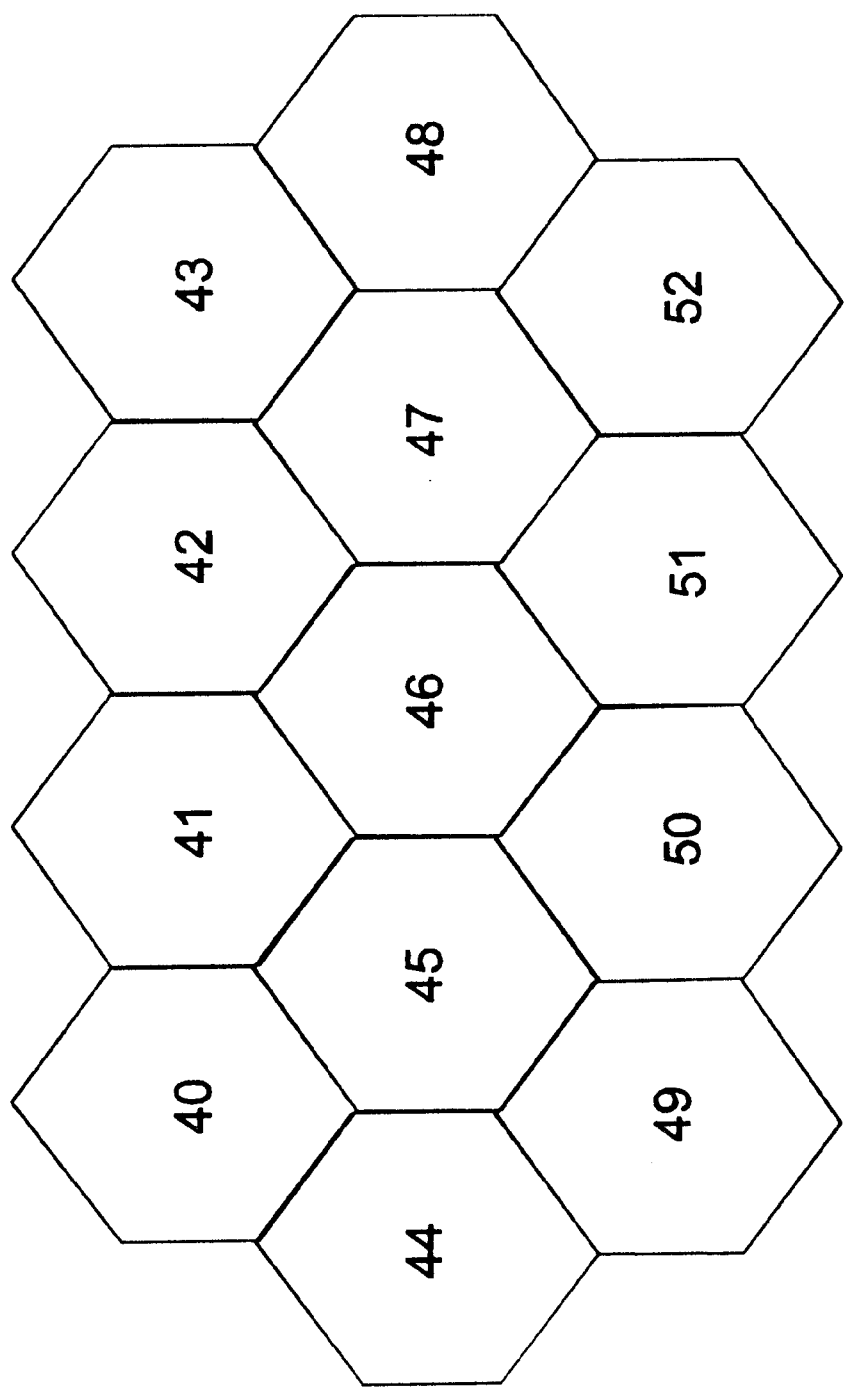
FIG. 2 is a diagram of satellite spotbeam footprints in a satellite communications system.

FIG. 2 illustrates an exemplary footprint areas of coverage for thirteen different spotbeams numbered consecutively 40–52. For example, if the mobile terminal 16 (in the satellite mode 16b) was currently in the area of coverage associated with spotbeam46, the mobile terminal 16 would receive location information associated with spotbeam 46, namely, its PSMN and LAC codes, and also receive a beam pair list of those spotbeams with which spot beam 46 can form a valid beam pair. These spotbeams in the beam pair list would be those spotbeams adjacent to the spotbeam 46. Thus, the beam pair list that would be transmitted for spotbeam 46 would be the following beam pairs: 46-41; 46-42; 46-47; 46-51; 46-50; and 46-45. Thus, if the mobile terminal 16 moved into any of the adjacent spotbeams which form a valid beam pair with spotbeam 46, no location updating would occur.

For example, if the mobile terminal 16 moved into the area of coverage associated with spotbeam 47, the mobile terminal 16 would recognize that spotbeam 47 forms a valid beam pair with spotbeam 46 and no location updating would be performed. If, however, the mobile terminal 16 then moved in the area of coverage associated with spotbeam 48, it would be out of the valid beam pair range and location updating of the mobile terminal would be required.

Every time the mobile terminal 16, in the satellite mode, performs a location update registering with the satellite system 14, new values for the various location codes are stored on the SIM card and the memory $E^2$ in the mobile terminal 16. The following conditions will trigger a satellite location update of the mobile terminal 16.

1. UPDATE_STATUS is not updated;
2. $PSMN_{BCCH}$ does not match $PSMN_{LR\_SAT}$;
3. $PLMN_{SIM}$ does not match $PLMN_{LR\_SAT}$; and
4. $LAC_{BCCH}$ does not match $LAC_{SIM}$.

The notation "BCCH" refers to location information broadcast on the control channel of the satellite system 14.

With the mobile terminal 16 in the satellite mode, as at 16b, location updating according to the inventive method will now be described with respect to FIG. 3. The method starts at block 60. At block 60, a determination has already been made by the mobile terminal 16 that if it is to perform a location update at all, it will do so in the satellite mode. Location updating by the mobile terminal 16 in the GSM mode is performed conventionally and is not considered part of the present invention.

Upon a determination that the mobile terminal 16 is in the satellite mode at block 60, the method proceeds to block 62 where it is determined whether a most recent registration (location update) of the mobile terminal 16 was accomplished in satellite or GSM mode. Specifically, the mobile terminal 16 compares the $PLMN_{SIM}$ code stored on the SIM card with the $PLMN_{LR\_SAT}$ stored on the memory $E^2$, and also compares the $LAC_{SIM}$ code stored on the SIM with the $LRC_{LR\_SAT}$ code stored on the memory $E^2$. If both pairs of codes match at block 62, this indicates that the last registration of the mobile terminal 16 was accomplished in the satellite mode and the method proceeds to block 64. If either of the two pairs of codes compared at block 62 do not match, this indicates that the last registration of the mobile terminal 16 was in the GSM mode and the method proceeds to block 66.

At block 66, the mobile terminal 16 determines if a satellite operator ID broadcast by the satellite system 14 ($PSMN_{BCCH}$) matches a satellite operator ID from a most recent satellite location update of the mobile terminal 16 ($PSMN_{LR\_SAT}$) and also determines whether a satellite beam pair in a satellite spotbeam pair list broadcast by the satellite system 14 (valid LAC in $BP\_LIST_{BCCH}$) matches a satellite beam pair in a satellite spotbeam ID ($LAC_{LR\_SAT}$) from a most recent satellite location update of the mobile terminal 16. If both code pairs are found to match at block 66, then the method proceeds to block 68 where the mobile terminal 16 initiates a location update procedure in the matching beam pair. For example, referring back to FIG. 2, if the mobile terminal 16b was in spotbeam 46 and moved to spotbeam 47, then at block 68 the mobile terminal 16 transmits a signal to the satellite system 14 indicating that it was registered in the beam pair 46-47. The inventive method then ends at block 70.

Referring back to FIG. 3, if, at block 66, either of the code pairs do not match, then the method proceeds to block 72 and the mobile terminal 16 initiates a location update in the location area code broadcast on the control channel of the satellite system 14. More specifically, at block 72, the mobile terminal 16 transmits a signal to the satellite system 14 registering it in the location covered by the PSMN and LAC codes currently broadcast by the satellite system 14 on the control channel. The method then ends at block 70.

If it is determined, at block 62, that the last registration of the mobile terminal 16 was in the satellite mode, then the method proceeds to block 64 where the update status flag (UPDATE_STATUS) of the mobile terminal 16 is checked to determine if location updating is necessary. Also, the PSMN code broadcast on the control channel of the satellite system ($PSMN_{BCCH}$) is compared with the PSMN code stored in the memory $E^2$ ($PSMN_{LR\_SAT}$) indicative of the last satellite registration of the mobile terminal 16. If it is determined, at block 64, that the update status flag indicates that updating is necessary, or, if the PSMN codes do not match, then the method proceeds to block 72 and the mobile terminal 16 initiates a location update using location information broadcast by the satellite system 14 as previously described. The method then ends at block 70.

If, at block 64, it is determined that the update status flag indicates that the location of the mobile terminal 16 has been recently updated, and also that the PSMN codes match, then the method proceeds to a block 74 where the LAC code stored on the SIM card ($LAC_{SIM}$) is compared with the LAC code broadcast by the satellite system ($LAC_{BCCH}$). If a match is found at block 74, then no location updating is needed and the method ends at block 76. If a match is not found at block 74, then the method proceeds to block 78 where the LAC code stored on the SIM ($LAC_{SIM}$) is compared with LAC codes in a beam pair list broadcast by the satellite system 14 (valid LAC in $BP\_LIST_{BCCH}$).

If a match is found at block 78, then the method proceeds to block 80 wherein the single serving LAC code of the spotbeam last serving the mobile terminal 16 ($SS\_LAC_{LAST\_SERV}$) is compared with the LAC code broadcast by the satellite system 14 ($LAC_{BCCH}$). If a match is found at block 80, then no location updating is needed and the method ends at block 82. If a match is not found at block 80, then the method proceeds to block 84 where the single serving LAC code of the spotbeam last serving the mobile terminal 16 ($SS\_LAC_{LAST\_SERV}$) is set equal to the LAC code broadcast on the control channel of the satellite system 14 ($LAC_{BCCH}$), and the beam pair list associated with the last serving spotbeam ($BP\_LIST_{LAST\_SERV}$) set equal to the beam pair list broadcast by the satellite system 14 ($BP\_LIST_{BCCH}$). The method then ends at block 82.

If, at block 78, the LAC code stored in the SIM ($LAC_{SIM}$) is not equal to a valid LAC code in the beam pair list broadcast on the control channel of the satellite system 14 (valid LAC in $BP\_LIST_{BCCH}$), then the method proceeds to block 86 where it is determined if a valid LAC code in a beam pair list of a spotbeam last serving the mobile terminal 16 (valid LAC in $BP\_LIST_{LAST\_SERV}$) matches a valid LAC code in the beam pair list broadcast on the control channel of the satellite system 14 (valid LAC in $BP\_LIST_{BCCH}$). If a match is found at block 86, then the method proceeds to block 88 and the mobile terminal 16 initiates location updating in the matching beam pair list. The method then ends at block 90.

If a match is not found at block 86, then the method proceeds to block 92 and the mobile terminal 16 initiates location updating utilizing the location information broadcast on the control channel of the satellite system 14. The method then ends at block 90.

FIG. 4 illustrates examples of the complete use of LOCI data when transitioning between GSM and satellite modes. The table of FIG. 4 shows the value stored on the SIM card and/or the memory $E^2$ after executing the appropriate location updating logic as the mobile terminal transitions according to the indications in rows 101–108 consecutively. For instance, row 101 illustrates the various LOCI data stored in the SIM card and the memory $E^2$ after the mobile terminal 16 has performed a successful location update in spotbeam 1. Row 102 illustrates the LOCI data stored upon the mobile terminal 16b entering spotbeam 2 which forms a valid beam pair with spotbeam 1. Row 103 illustrates the LOCI data stored upon the mobile terminal 16 transitioning back to spotbeam 1 from spotbeam 2. Row 104 illustrates the LOCI data stored upon the mobile terminal 16 entering the GSM mode. Row 105 illustrates the LOCI data stored upon the mobile terminal 16 transitioning back to the satellite mode and located within the area of coverage of either spotbeam 1 or spotbeam 2. Row 106 illustrates the LOCI data stored upon the mobile terminal 16 entering spotbeam 3, which does not form a valid beam pair with spotbeam 1. Row 107 illustrates the LOCI data stored upon the mobile terminal 16 entering the GSM mode again. Row 108 illustrates the LOCI data stored upon the mobile terminal 16 returning to the satellite mode and located either in the area of coverage of spotbeam 3.

As previously noted, the present invention is not limited to GSM, but may be used with other types of terrestrial mobile terminals such AMPS phones. FIG. 5 illustrates examples of the LOCI data stored on the SIM card and/or memory $E^2$ after location updating logic is executed with the mobile terminal transitioning between satellite and AMPS modes. The examples in FIG. 5 illustrate the various LOCI data that is stored as the mobile terminal transitions from the various spotbeams and modes of operation beginning at row 111 and continuing consecutively to row 118. This succession follows generally that of FIG. 4 with the mobile terminal transitioning to an AMPS mode of operation instead of GSM. Accordingly, a detailed discussion is not necessary.

While the inventive method has been described utilizing information stored on both the SIM card and the memory $E^2$, it should be understood that the present invention is also contemplated for use with a dual GSM/satellite SIM card. Such a SIM card would have a common satellite/GSM portion storing the information provided in the left column of Table 1, and a satellite only SIM portion storing the information provided in the right column of Table 1.

While the present invention has been described with particular reference to the drawings, it should be understood that various modifications could be made without departing from the spirit and scope of the present invention.

What is claimed is:

1. A method of interpreting location area information data in a satellite/terrestrial dual mode mobile terminal with the mobile terminal in the satellite mode and communication with a satellite system, the method comprising the steps of:
   (a) determining if a most recent registration of the mobile terminal was accomplished in satellite or terrestrial mode;
   (b) if it is determined that the most recent registration of the mobile terminal was accomplished in the terrestrial mode at step (a), then determining if (1) a satellite operator ID broadcast by the satellite system matches a satellite operator ID from a most recent satellite location update of the mobile terminal, and (2) a satellite beam pair in a satellite spotbeam pair list broadcast by the satellite system matches a satellite beam pair in a satellite spotbeam ID from a most recent satellite location update of the mobile terminal; and
   (c) if matches are determined at steps (b)(1) and (b)(2), then initiating a location update of the mobile terminal with the satellite system in the matching satellite beam pair determined at step (b)(2).

2. A method of interpreting location area information data in a satellite/terrestrial dual mode mobile terminal with the mobile terminal in the satellite mode and communication with a satellite system, the method comprising the steps of:
   (a) determining if a most recent registration of the mobile terminal was accomplished in satellite or terrestrial mode;
   (b) if it is determined that the most recent registration of the mobile terminal was accomplished in the terrestrial mode at step (a), then determining if (1) a satellite operator ID broadcast by the satellite system matches a satellite operator ID from a most recent satellite location update of the mobile terminal, and (2) a satellite beam pair in a satellite spotbeam pair list broadcast by the satellite system matches a satellite beam pair in a satellite spotbeam ID from a most recent satellite location update of the mobile terminal; and
   (c) if matches are not determined at both steps (b)(1) and (b)(2), then initiating a location update of the mobile terminal with the satellite system in a satellite spotbeam ID broadcast by the satellite system.

3. A method of interpreting location area information data in a satellite/terrestrial dual mode mobile terminal with the mobile terminal in the satellite mode and communication with a satellite system, the method comprising the steps of:
   (a) determining if a most recent registration of the mobile terminal was accomplished in satellite or terrestrial mode;
   (b) if it is determined that the most recent registration of the mobile terminal was accomplished in the satellite mode at step (a), then determining if (1) an update status flag stored in the mobile terminal indicates that the mobile terminal does not need to perform a location update, and (2) a satellite operator ID broadcast by the satellite system matches a satellite operator ID from a most recent satellite location update of the mobile terminal; and
   (c) if either answer to the determinations at steps (b)(1) and (b)(2) is no, then initiating a location update of the mobile terminal with the satellite system in a satellite spotbeam ID broadcast by the satellite system.

4. A method of interpreting location area information data in a satellite/terrestrial dual mode mobile terminal with the mobile terminal in the satellite mode and communication with a satellite system, the method comprising the steps of:
   (a) determining if a most recent registration of the mobile terminal was accomplished in satellite or terrestrial mode;
   (b) if it is determined that the most recent registration of the mobile terminal was accomplished in the satellite mode at step (a), then determining if (1) an update status flag stored in the mobile terminal indicates that the mobile terminal does not need to perform a location update, and (2) a satellite operator ID broadcast by the satellite system matches a satellite operator ID from a most recent satellite location update of the mobile terminal;
   (c) if answers to the determinations at steps (b)(1) and (b)(2) are both yes, then determining if a satellite spotbeam ID broadcast by the satellite system matches a satellite spotbeam ID from a most recent satellite location update of the mobile terminal; and
   (d) if an answer to the determination at step (c) is yes, then indicating that no location update of the mobile terminal is necessary.

5. A method of interpreting location area information data in a satellite/terrestrial dual mode mobile terminal with the mobile terminal in the satellite mode and communication with a satellite system, the method comprising the steps of:
   (a) determining if a most recent registration of the mobile terminal was accomplished in satellite or terrestrial mode;
   (b) if it is determined that the most recent registration of the mobile terminal was accomplished in the satellite mode at step (a), then determining if (1) an update status flag stored in the mobile terminal indicates that the mobile terminal does not need to perform a location update, and (2) a satellite operator ID broadcast by the satellite system matches a satellite operator ID from a most recent satellite location update of the mobile terminal;
   (c) if answers to the determinations at steps (b)(1) and (b)(2) are both yes, then determining if a satellite spotbeam ID broadcast by the satellite system matches a satellite spotbeam ID from a most recent satellite location update of the mobile terminal;
   (d) if an answer to the determination at step (c) is no, then determining if a satellite beam pair in a satellite spotbeam pair list broadcast by the satellite system matches a satellite beam pair in the satellite spotbeam ID from the most recent satellite location update of the mobile terminals;
   (e) if an answer to the determination at step (d) is yes, then determining if a satellite spotbeam ID of a spotbeam last serving the mobile terminal matches the satellite spotbeam ID broadcast by the satellite system; and
   (f) if an answer to the determination at step (c) is yes, then indicating that no location update of the mobile terminal is necessary.

6. A method of interpreting location area information data in a satellite/terrestrial dual mode mobile terminal with the mobile terminal in the satellite mode and communication with a satellite system, the method comprising the steps of:

(a) determining if a most recent registration of the mobile terminal was accomplished in satellite or terrestrial mode;

(b) if it is determined that the most recent registration of the mobile terminal was accomplished in the satellite mode at step (a), then determining if (1) an update status flag stored in the mobile terminal indicates that the mobile terminal does not need to perform a location update, and (2) a satellite operator ID broadcast by the satellite system matches a satellite operator ID from a most recent satellite location update of the mobile terminal;

(c) if answers to the determinations at steps (b)(1) and (b)(2) are both yes, then determining if a satellite spotbeam ID broadcast by the satellite system matches a satellite spotbeam ID from a most recent satellite location update of the mobile terminal;

(d) if an answer to the determination at step (c) is no, then determining if a satellite beam pair in a satellite spotbeam pair list broadcast by the satellite system matches a satellite beam pair in the satellite spotbeam ID from the most recent satellite location update of the mobile terminals;

(e) if an answer to the determination at step (d) is yes, determining if a satellite spotbeam ID of a spotbeam last serving the mobile terminal matches the satellite spotbeam ID broadcast by the satellite system;

(f) if an answer to the determination at step (e) is no, then replacing, at the mobile terminal, (1) the satellite spotbeam ID of the spotbeam last serving the mobile terminal with the satellite spotbeam ID broadcast by the satellite system, and (2) a satellite beam pair list associated with the spotbeam last serving the mobile terminal with a satellite beam pair list broadcast by the satellite system; and (g) indicating that no location update of the mobile terminal is necessary.

7. A method of interpreting location area information data in a satellite/terrestrial dual mode mobile terminal with the mobile terminal in the satellite mode and communication with a satellite system, the method comprising the steps of:

(a) determining if a most recent registration of the mobile terminal was accomplished in satellite or terrestrial mode;

(b) if it is determined that the most recent registration of the mobile terminal was accomplished in the satellite mode at step (a), then determining if (1) an update status flag stored in the mobile terminal indicates that the mobile terminal does not need to perform a location update, and (2) a satellite operator ID broadcast by the satellite system matches a satellite operator ID from a most recent satellite location update of the mobile terminal;

(c) if answers to the determinations at steps (b)(1) and (b)(2) are both yes, then determining if a satellite spotbeam ID broadcast by the satellite system matches a satellite spotbeam ID from a most recent satellite location update of the mobile terminal;

(d) if an answer to the determination at step (c) is no, then determining if a satellite beam pair in a satellite spotbeam pair list broadcast by the satellite system matches a satellite beam pair in the satellite spotbeam ID from the most recent satellite location update of the mobile terminals;

(e) if an answer to the determination at step (d) is no, then determining if a satellite beam pair in the satellite spotbeam pair list broadcast by the satellite system matches a satellite beam pair in a satellite spotbeam ID of a spotbeam last serving the mobile terminal; and (f) if an answer to the determination at step (e) is yes, then initiating a location update of the mobile terminal with the satellite system in the matching beam pair determined at step (e).

8. A method of interpreting location area information data in a satellite/terrestrial dual mode mobile terminal with the mobile terminal in the satellite mode and communication with a satellite system, the method comprising the steps of:

(a) determining if a most recent registration of the mobile terminal was accomplished in satellite or terrestrial mode;

(b) if it is determined that the most recent registration of the mobile terminal was accomplished in the satellite mode at step (a), then determining if (1) an update status flag stored in the mobile terminal indicates that the mobile terminal does not need to perform a location update, and (2) a satellite operator ID broadcast by the satellite system matches a satellite operator ID from a most recent satellite location update of the mobile terminal;

(c) if answers to the determinations at steps (b)(1) and (b)(2) are both yes, then determining if a satellite spotbeam ID broadcast by the satellite system matches a satellite spotbeam ID from a most recent satellite location update of the mobile terminal;

(d) if an answer to the determination at step (c) is no, then determining if a satellite beam pair in a satellite spotbeam pair list broadcast by the satellite system matches a satellite beam pair in the satellite spotbeam ID from the most recent satellite location update of the mobile terminals;

(e) if an answer to the determination at step (d) is no, then determining if a satellite beam pair in the satellite spotbeam pair list broadcast by the satellite system matches a satellite beam pair in a satellite spotbeam ID of a spotbeam last serving the mobile terminal; and (f) if an answer to the determination at step (e) is no, then initiating a location update of the mobile terminal with the satellite system in the satellite spotbeam ID broadcast by the satellite system.

* * * * *